United States Patent [19]
Walker

[11] 3,751,698
[45] Aug. 7, 1973

[54] PLURAL ELECTRIC MOTORS

[76] Inventor: Alan J. Walker, 387 Maidstone Rd., Gillingham, Kent, England

[22] Filed: June 28, 1971

[21] Appl. No.: 157,576

[30] Foreign Application Priority Data
June 30, 1970 Great Britain.................. 31,479/70

[52] U.S. Cl................................. 310/126, 310/231
[51] Int. Cl. ........................................... H02k 21/10
[58] Field of Search..................... 310/46, 112, 114, 310/120, 128, 231, 232, 236, 238, 239, 219

[56] References Cited
UNITED STATES PATENTS
1,526,613  2/1925  Stephenson..................... 310/128 X
843,287    2/1907  Mac Coy ......................... 310 46 X
2,657,322  10/1953 Holst............................. 310 126 X FOREIGN PATENTS OR APPLICATIONS
893,077   10/1953  Germany ........................... 310/126

Primary Examiner—D. F. Duggan
Attorney—D. S. Edmonds, Robert McKay et al.

[57] ABSTRACT

This invention relates to electric motors in which the commutating means are controllable and operated independently of the armature. The invention also relates to such motors where the armature is integral with the impeller of a pump and fluidly isolated from the stator and other parts of the motor.

The invention affords speed control of electric motors.

9 Claims, 7 Drawing Figures

PLURAL ELECTRIC MOTORS

DESCRIPTION OF THE INVENTION

This invention relates to electric motors of the type in which a rotating magnetic field causes the armature to rotate, and to the speed control of such motors. The invention also relates to such motors when associated with pumps for fluids and in particular to the type in which the pump is an integral part of the motor.

Electric motors of the rotating magnetic field type, for example, three phase motors, or capacitor-run motors which achieve two phase operation from a single phase supply, suffer from a disadvantage in that they operate only at a given speed of rotation which is related to the frequency of the supply and the number of stator poles of the motor. Speed control of such motors is difficult to achieve, and usually incurrs penalties such as loss of torque and reduced power factors. In practice, therefore, when variable speed drives are required, the motors are used in conjunction with speed changing means such as infinitely variable friction drives, gearboxes (as in machine tools for example), hydraulic converters and the like.

However, an advantage of such a motor, is that the armature may be devoid of external electrical connections such as contact brushes co-operating with slip rings or a commutator, being of the squirrel-cage or even permanent-magnet type. Such an armature may with advantage comprise, or be integral with, the impeller of a pump for fluids such as, for example, a "glandless" pump in a central heating system, where the output of the pump is normally controlled by throttling the fluid flow to suit the demands of the system. It is believed to be advantageous to meet the demands of the system by varying the speed of rotation of the motor in co-operation with control means, such as an environment temperature controller for example, which thereby affords stepless variation of fluid flow to suit the prevailing conditions of environment, or other varying system parameter. Alternatively, the power output of the motor may be varied to suit a varying fluid demand upon the pump. Such variation may be either automatic or manually controlled.

Aims of the invention are to provide improved electric motors, and electric motors associated with pumps for fluids, so adapted that the speed of rotation of the armature may be varied by varying the speed of rotation of the magnetic field, yet retaining the advantage of an armature without external electrical connections, which may then be fluidly separated to comprise the impeller of a pump, is so desired.

In order to vary the speed of rotation of the magnetic field, an independently operated commutator is provided, the output of which is in electrical connection with the field windings of the stator, and the input is electrically connected to a supply of electrical energy. By these means, the supply is momentarily and consecutively connected to each field winding provided around the stator, when the commutator is operated, thus producing a magnetic field in the stator rotating at speed related to and governed by the rate of commutation.

According to the invention an electric motor comprises: an armature co-operating with a stator which has two or more poles of magnetic material associated with inductive windings; independently operated commutating means, electrically connected to said stator windings and for connection to a supply of electrical energy, whereby a rotating magnet field may be produced in the stator to rotate the armature at a speed related to the rate of commutation. The speed of the motor may therefore be controlled by varying the rate of commutation.

The commutating means may be driven by a further electric motor associated with control means for controllably varying the speed thereof. Such a further motor may be incorporated within the structure of the electric motor by providing a further armature co-operating with the stator. The further armature may comprise a permanent magnet, or an electrically conductive ring urged to rotate by eddy currents induced therein, drivably connected to the commutator means, and rotatably independent of the electric motor armature. The commutating means may be separate from the motor and incorporates therein a further motor, driven thereby via a flexible drive.

The speed of rotation of the further armature, and therefore the rate of commutation, may be varied by means of an electrically conductive ring or disc attached to the further armature and rotatable therewith, co-operating with a magnet which exerts a retarding force upon the ring or disc by virtue of the eddy currents it induces therein. The speed of rotation of the further armature may therefore be varied by either changing the position of the magnet relative to the ring or disc, or by varying the magnetic field of the magnet. The further armature may also comprise two or more poles of magnetic material associated with further inductive windings and which will be caused to rotate in the presence of a stator magnetic field, when electrical energy is supplied to the further windings. By varying the supply of electrical energy to the further windings, the speed of rotation, and therefore the rate of commutation, may be also varied. Slip-rings co-operating with contact-brushes may be used to connect the further windings to a suitable supply of electrical energy via rheostatic means for controlling the electrical current.

Further according to the invention, the commutating means may comprise a plurality of electrically conducting contact segments in fixed and rigid annular arrangement, each segment being electrically connected with one or more stator windings and co-operating with brush means, rotatable about an axis, which successively connect said segments to a supply of electrical energy when said brush means are driven to rotate, preferably by said further motor. The brush means may be provided with two or more contact-brushes in rubbing or sliding electrical contact with said segments and which may be connected to a supply of electrical energy by means of further slip-rings.

The contact segments may be arranged in ordered groups, the number of segments in any one group being equal to the number of stator poles, wherein corresponding segments of every group are electrically connected together. The required speed of rotation of the brush means for a given armature speed of rotation is thus reduced by a factor equal to the number of group.

An electric motor according to the invention also comprises an armature and stator, separated and fluidly isolated from one another by means of a fluid-tight wall, which extends through the annular magnetic gap formed between the adjacent magnetically operative surfaces of the stator and armature. The armature may comprise the rotor or impeller of a pump for fluids, and the fluid-tight wall may comprise a substantial part of the pump casing to form a "gland-less" pump, or may retain the fluid contents of the pump.

The armature of an electric motor according to the invention may comprise a permanent magnet, for example, in the shape of a ring, or a squirrel-cage type rotor, or a steromotor type armature which rolls around the pole surface of a stator in step with a rotating magnetic field thereof. The armature may be arranged to co-operate with either the internal or external surfaces of a stator according to specific requirements.

The invention includes within its scope electric motors provided with electronic commutators wherein, for example, semiconductor switching devices produce a rotating field in the stator, when triggered by a variable frequency oscillator such as a multivibrator. Pumps generally as herein described are also included within the scope of the invention.

Embodiments of the invention will now be described by way of example, with reference to the following accompanying drawings.

Figure 1:
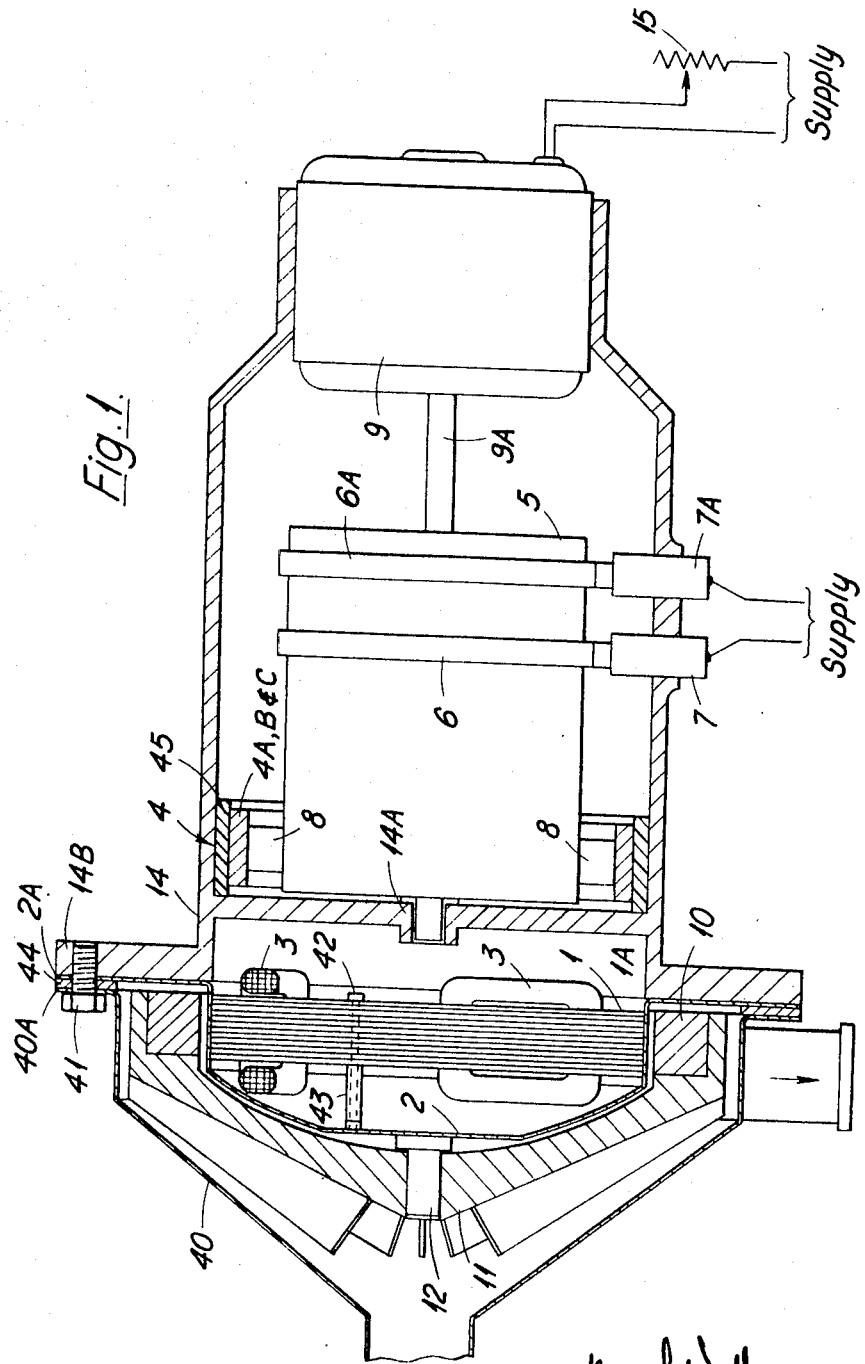
FIG. 1 shows an electric motor according to the invention, which is integral with a pump for fluids, provided with a commutator driven by a separate electric motor.

Referring to FIG. 1, a "gland-less" pump is provided comprising a casing 14 relative to which a stator 1 of laminated magnetic material is fastened in spaced relationship by means of screws 42 and spacers 43 co-operating with cap 2, and has three external poles 1A each of which is provided with an inductive winding 3.

The stator is enclosed with casing 14 by the domed fluid-retaining cap 2 of thin non-magnetic material, provided with a flange 2A by which it is fastened to flange 14B of casing 14 by screws 41. The same screws 41 also pass through flange 40A of pump casing 40, and a gasket 44 of elastomeric material which provides a fluid-tight seal between casing 40 and cap 2 when screws 41 are tightened.

An armature 11 of cast bronze or other suitable alloy, is rotatably mounted upon the dome of cap 2 by means of shaft 12 rigidly fastened to the cap 2. The armature 11 also comprises the pump impeller by reason of blades 13 integral therewith. A permanent ring magnet 10, rigidly and concentrically attached to the armature 11, encircles the poles 1A of stator 1 in close spaced arrangement therewith and with cap 2 which extends between the annular gap formed between poles 1A and magnet 10. A "gland-less" pump is thus provided in which the armature or impeller 11 is influenced to rotate when a rotating magnetic field is created in the stator 1 by the windings 3 co-operating with a commutator 4. If required, the poles 1A may be in thermal contact with the encircling cylindrical portion of cap 2, thus to be cooled by the fluid within the pump.

Figure 4:
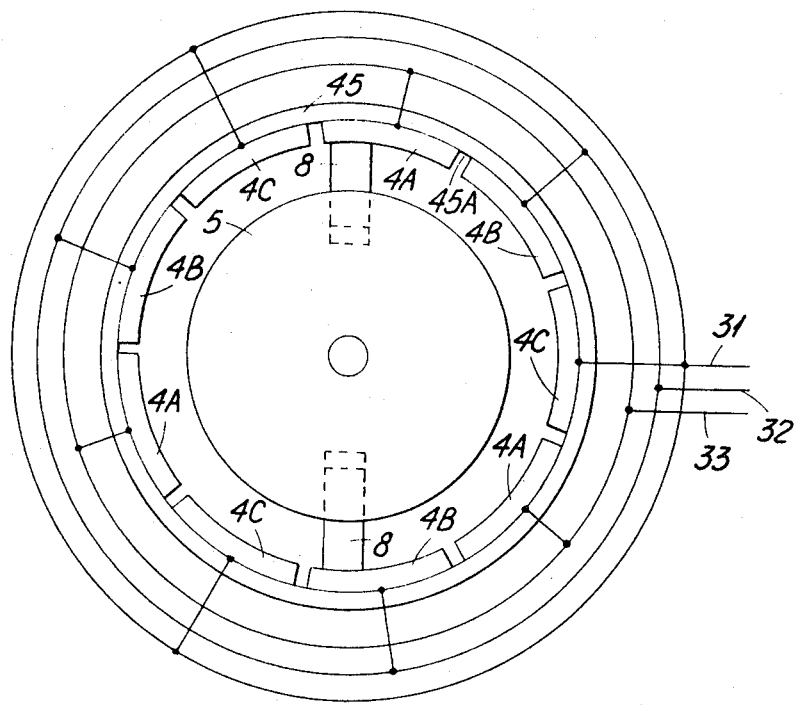
FIG. 4 is an end view of the commutator as used in the electric motors of the previous figures.

The commutator 4 comprises an annular arrangement of nine equispaced electrically conducting segments 4A, 4B & 4C electrically insulated from one another (see also FIG. 4) and rigidly fastened to the inside surface of an electrically insulating support ring 45 which is itself rigidly fastened to the casing 14 in concentricity therewith. All three segments 4A are electrically connected together, so too are all segments 4B, and also all segments 4C. The three groups of segments 4A, B & C thus formed are connected to three connecting points of the stator pole windings 3 connected in either "star" or "delta" arrangement by electrical conductors 31, 32 & 33.

The inward facing surfaces of all segments 4A, B & C lie on the surface of imaginary cylinder, the central axis of which is parallel and coincident with the extended central axis of the armature 11. Rotating about the same axis is a brush-holder 5, attached to the shaft 9A of variable speed electric motor 9 and rotatably driven thereby. The motor 9 is mounted within casing 14, and shaft 9A extending therethrough to rotate in a journalled bearing 14A of casing 14. Two contact brushes 8 mounted in the brush-holder 5 are spring-urged outwardly to make contact with the inward facing surfaces of the segments 4A, B or C, so that when the brush-holder 5 rotates when driven by motor 9, the brushes 8 sweep around the segment surfaces. One brush 8 is electrically connected to a slip-ring 6 and the other to slip-ring 6A, both of which are attached to brush-holder 5 and co-operating with further contact brushes 7 & 7A respectively connected to supply of electrical energy.

The variable speed motor 9 is also connected to a supply of electrical energy via a rheostat 15 by which means the speed of rotation of the motor 9 and therefore that of the brush-holder 5 may be varied.

As the brush-holder 5 is caused to rotate, the brushes 8 in co-operation with segments 4A, B & C create a rotating magnetic field in the stator 1, the speed of rotation of which being three times that of brush-holder 5 by reason of the triplication of segments 4A, B & C. By grouping segments in this manner, low brush speeds are afforded with consequent increase in brush life. The inward facing arrangement of segments 4A, B & C affords a further advantage in that centrifugal forces acting on the brushes 8 urges them into closer contact with the segments 4A, B & C.

Figure 2:
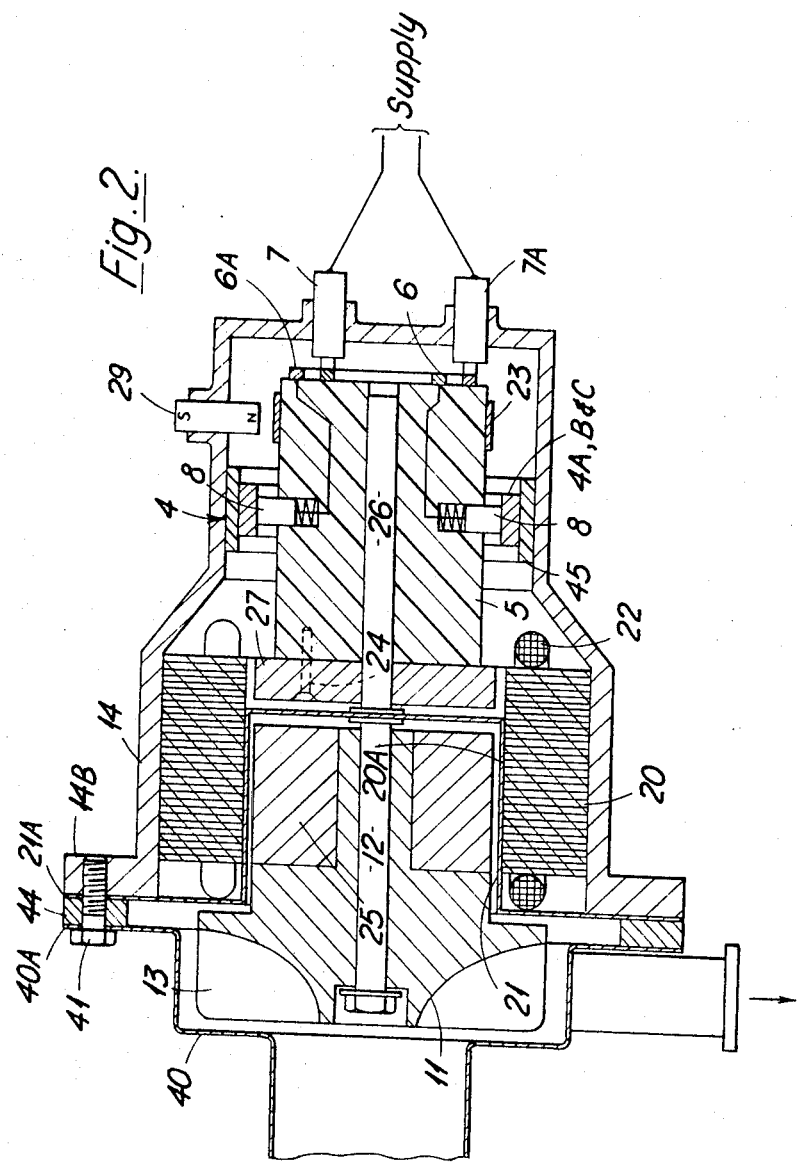
FIG. 2 illustrates another electric motor integral with a pump in which the commutator is driven by a secondary armature influenced by the stator field.

The embodiment of FIG. 2 comprises a stator 20 having three inwardly facing poles 20A each provided with an inductive winding 22, and rigidly fastened to casing 14. An armature 11 rotatably mounted upon shaft 12, is arranged concentrically within stator 20 but separated therefrom by fluid-retaining shell 21 of thin non-magnetic material to which shaft 12 is rigidly attached. The armature 11 has integral impeller blades 13 and a rigidly attached permanent ring magnet 25 which co-operates with the stator and rotates when influenced by a rotating magnetic field therein, thus rotating the impeller 13 within pump-casing 40 (only part shown). Shell 21 is in fluid-tight connection with casing 40, a seal being effected by means of gasket 44 of elastomeric material and screws 41 which fasten the pump-casing 40 and shell 21 to the flange 14B of casing 14, and extends through the annular gap formed between the inward facing pole surfaces and the outward facing surface of the armature 11 to fluidly isolate the armature 11 from the stator 20 and the remainder of the motor.

The commutator 4, again comprises three groups of three segments 4A, 4B & 4C arranged as herein described, co-operating with brushes 8 of brush-holder 5 which is free to rotate upon shaft 26 this being an extension of shaft 12 extending through shell 13 in fluid-tight manner. Again brushes 8 are connected to a supply of electrical energy by means of slip-rings 6 & 6A co-operating with brushes 7 & 7A.

Brush-holder 5 is rotatably driven by a secondary armature 27, attached thereto by screws 24, arranged within an extension of stator 20 beyond the bounds of shell 13, and influenced by a magnetic field therein to rotate. The armature 27 may comprise a permanent ring magnet or a ring of low electrical resistivity which would be caused to rotate by eddy-currents induced therein, however, a motor incorporating such an eddy-current armature 27 would not be self-starting in view of the initially stationary magnetic field upon connecting to a supply of electricity.

The speed of rotation of the brush-holder 5, and therefore that of the armature 11 may be varied by exerting a retarding force upon the brush-holder 5 by means of friction pads, or an eddy-current brake, as illustrated, comprising a ring 23 of low electrical resistivity attached to and rotating with the brush-holder 5, and acted upon by a magnet 29. By varying the distance of the magnet 29 from the ring 23, the retarding force may be varied.

Figure 3:
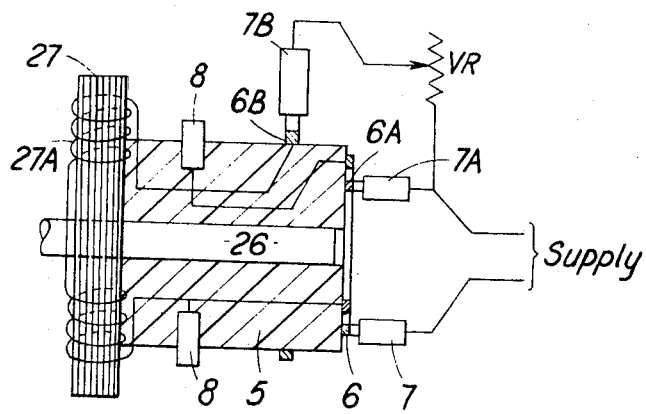
FIG. 3 shows the electric motor of FIG. 2 in which the secondary armature is provided with control windings.

FIG. 3 shows a variation of the embodiment just described, in which armature 27 comprises two poles 27A of laminated magnetic material, associated with an inductive winding 27B electrically connected to slip-ring 6 and an additional slip-ring 6B co-operating with additional brush 7B. A rheostat 46 connected between brushes 7B and 7A, allows the electrical current passing through winding 27B to be varied, thus changing the speed of rotation of brush-holder 5 and therefore that of armature 11. The number of poles 27A may be increased if desired, to obtain smoother rotation of brush-holder 5 or to suit the number of stator-poles provided.

Figure 5:
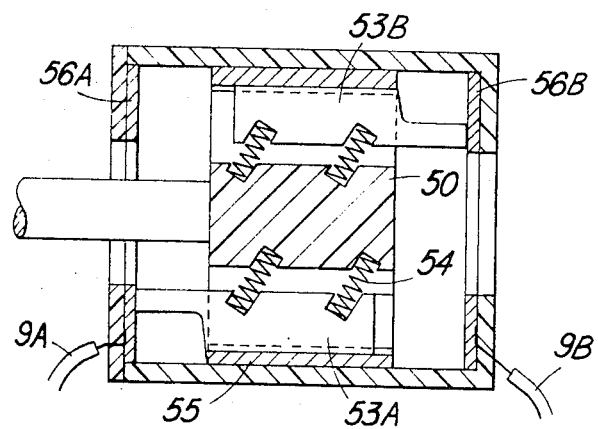
FIG. 5 shows a section through a commutator in which the brushes are urged radially outwards to contact commutator segments and urged axially to contact slip-rings.

Referring to FIG. 5, a commutator is shown where each brush performs two duties namely to contact the commutator segments and also to contact the slip-rings.

Brushes 53A & 53B are free to slide within radial slots 50A and 50B in brush-holder 50 which is formed of electrically insulating material, and are urged radially outwards and axially by springs 54 which are inclined toward the longitudinal axis of the commutator. Thus brush 53A is urged to contact segments 55 which connect with the stator windings and to contact slip-ring 56A which is for connection to one side of an electrical supply. Likewise, brush 53B contacts segments 55 and slip-ring 56B which is for connection to the other side of the supply.

Figure 6:
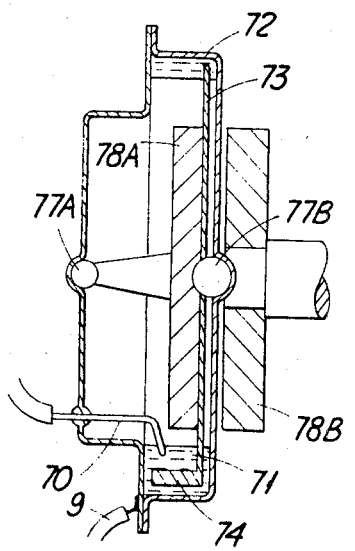
FIG. 6 is a sectional side elevation of a commutator in which mercury is used as the contacting medium.
Figure 7:
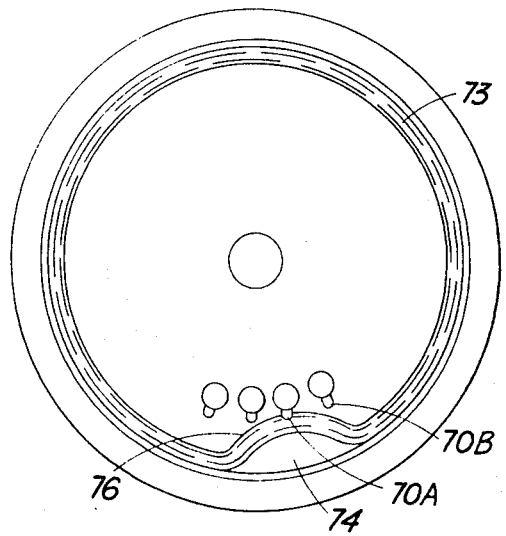
FIG. 7 is a section through the elevation of FIG. 6.

Brush-holder 50 is driven to rotate by shaft 57 which may be the shaft of a separate auxiliary variable speed motor or may be driven by the further armature 27.

Where a separate auxiliary motor is used to drive the commutating means, the commutator may conveniently be hermetically sealed and use mercury as the segment contacting medium. FIGS. 6 and 7 show such a commutator in which a sealed cylindrical housing, of a material compatible with mercury, contains mercury 71 which can be centrifugally forced into peripheral contact with the housing by means of disc 73 when the disc 73 is driven to rotate. The disc 73 is rotated by a magnet 78B situated externally to the housing 72 and driven to rotate by the shaft 79 of the auxiliary motor (not shown). As magnet 78B revolves, a magnet 78A, attached to disc 73, is influenced thereby and also revolves thus rotating the disc. Ball-type bearings 77A and 77B support the disc 73 and permit free rotation thereof within housing 72.

As disc 73 rotates, the mercury 71, by reason of frictional drag, also rotates as a ring of mercury but at a lower speed than the disc.

A wave producing member 74 attached adjacent the periphery of the disc 73 is immersed in mercury 71 and creates a wave-like formation 76 in the mercury which moves around and within the periphery of housing 72. As wave 76 moves, the crest thereof makes electrical contact with a series of electrical contact wires 70, each of which extend hermetically through the wall of housing 72, electrically insulated therefrom, and which connect with stator windings. Thus as shaft 79 rotates, the mercury wave 76 created in consequence, sequentially contacts the contact wires 70 and connects each in passing to one side of a supply of electricity via the housing 72 if this is electrically conductive or by an extra contact (not shown) immersed in the mercury if it is not.

Since only one mercury wire is provided in the embodiment of FIG. 6 the stator windings should all have a common connection, as in "star" connection, which is connected to the other side of the supply of electricity. Alternatively, two housings 72 could be used each having a disc 73 but the two discs mechanically coupled one with the other, and the two housings 72 electrically insulated one from the other.

Each embodiment herein described is provided with a permanently magnetised armature and will therefore only operate with a supply of direct current or rectified alternating current, in which case, rectifiers may be incorporated in brush-holders 5, to provide the connections between brushes 8 and slip-rings 6 and 6A, thus enabling alternating current to be used at all times. Alternatively, the armatures 11 may be of the squirrel-cage type, in which case alternating current may be used without the need for rectification.

The invention also includes within its scope, electric motors generally as herein described, and electric motors wherein the pole surfaces define a surface of revolution, or lie in a flat plane as, for example, in a linear electric motor.

The motor 9 and the commutator may be separate from the motor/pump combination, connected thereto by means of electric cables, thus permitting the pump to operate submerged whilst the component subject to wear, i.e., the commutator, remains accessible for maintenance.

Although 3-pole motors have been described herein by way of example, any number of poles above two may be provided to suit the size of motor and the type of application.

I claim:

1. An electric motor comprising a stator having a plurality of poles associated with inductive windings, an armature, and commutating means for electrical connection to a supply of electrical energy and electrically connected to said inductive windings, and a further armature drivingly coupled to said commutating means and mounted within said stator for rotation therein independent of said armature, and further armature speed control means.

2. An electric motor comprising a stator having a plurality of poles associated with inductive windings, an armature, a pump impeller integral with said armature for rotation therewith, commutating means for connection to a supply of electrical energy and electrically connected to said inductive windings, and a further armature drivingly coupled to said commutating means and mounted within said stator for rotation therein independent of said armature, and means for fluidly isolating said armature from said stator said commutating means and said further armature, and further armature speed control means.

3. An electric motor comprising a stator having a plurality of poles associated with inductive windings, an armature, commutating means for electrical connection to a supply of electrical energy and electrically connected to said inductive windings, a further armature drivingly coupled to said commutating means and mounted within said stator for rotation therein independent of said armature, and further armature speed control means comprising a ring of material of high electrical conductance attached to said further armature to rotate therewith and having a magnet adjustably mounted adjacent said ring with the field of the magnet passing through the material of said ring.

4. An electric motor comprising a stator having a plurality of poles associated with inductive windings, an armature, commutating means for electrical conduction to a supply of electrical energy and electrically connected to said inductive winding, a further armature drivingly coupled to said commutating means and mounted within said stator for rotation therein independent of said armature wherein said further armature is provided with inductive windings electrically connected to slip rings and brushes therewith, and further armature speed control means comprising electric circuit control means electrically connected to said brushes for connection to a supply of electrical energy.

5. An electric motor comprising a stator having a plurality of poles associated with inductive windings, an armature, commutating means comprising a plurality of electrically conductive contact segments in fixed and annular arrangement about an axis with each said segment being electrically insulated from the other said segments and electrically connected to at least one of said inductive windings and brush means for connection to a supply of electrical energy mounted for driven rotation about said axis in successive sliding contact with said segments, a further armature drivingly coupled to said commutating means and mounted within said stator for rotation therein independent of said armature, and further armature speed control means.

6. An electric motor comprising a stator having a plurality of poles associated with inductive windings; an armature; commutating means electrically connected to said inductive windings and for connection to a supply of electrical energy where said commutating means comprises a cylindrical housing with an annular channel formed in the periphery thereof containing mercury, a disc the periphery of which extends into said channel in spaced relationship therewith, wave-making means attached to said disc adjacent the periphery thereof and immersed in said mercury, bearing means supporting said disc for rotation within said housing, magnetic means attached to said disc for rotation therewith, and a plurality of electrical contacts electrically insulated one from the other and from said housing extending into said housing in fixed annular arrangement concentric therewith with the end of each said contact extending toward and into said channel but spaced therefrom and with each said contact being electrically connected to at least one said inductive winding; and independent and controllable commutator driving means where said driving means comprises an independent variable speed motor having a shaft and further magnetic means attached to said shaft for rotation therewith mounted adjacent and external to said housing in magnetic coupling with said magnetic means.

7. An electric motor comprising a stator having a plurality of poles associated with inductive windings; an armature; a pump impeller integral with said armature for rotation therewith; commutating means for connection to a supply of electrical energy and electrically connected to said inductive windings; a further armature drivingly coupled to said commutating means and mounted within said stator for rotation therein independent of said armature; means for fluidly isolating said armature from said stator, said commutating means and said further armature; and a further armature speed control means comprising eddy current brake means.

8. An electric motor comprising a stator having a plurality of poles associated with inductive windings; an armature; a pump impeller integral with said armature for rotation therewith; commutating means for connection to a supply of electrical energy and electrically connected to said inductive windings; a further armature drivingly coupled to said commutating means and mounted within said stator for rotation therein independent of said armature, said armature being provided with an inductive winding electrically connected to slip rings and brushes associated therewith; means for fluidly isolating said armature from said stator, said commutating means and said further armature; and further armature speed control means comprising electrical current control means electrically connected to said brushes and for connection to a supply of electrical energy.

9. An electric motor comprising a stator having a plurality of poles associated with inductive windings; an armature; a pump impeller integral with said armature for rotation therewith; commutating means for connection to a supply of electrical energy where said commutating meaans comprises a plurality of electrically conductive segments in fixed annular arrangement about an axis with each said segment being electrically insulated from the other said segments and electrically connected to at least one of said inductive windings, and having brush means for connection to a supply of electrical energy mounted for driven rotation about said axis in successive contact with said segment; a further armature drivingly coupled to said commutating means and mounted within said stator for rotation therein independent of said armature; means for fluidly isolating said armature from said stator, said commutating means and said further armature; and further armature speed control means.

* * * * *